US012712864B2

(12) United States Patent
Raghuram et al.

(10) Patent No.: US 12,712,864 B2
(45) Date of Patent: Aug. 18, 2026

(54) SYSTEMS AND METHODS FOR KEY ACCESS DISTRIBUTION AND MANAGEMENT

(71) Applicant: Intel Corporation, Santa Clara, CA (US)

(72) Inventors: Yeluri Raghuram, Sunnyvale, CA (US); Anil Rao, Menlo Park, CA (US); Haidong Xia, Folsom, CA (US); Uttam Shetty, Granite Bay, CA (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/373,615

(22) Filed: Sep. 27, 2023

(65) Prior Publication Data

US 2024/0022550 A1 Jan. 18, 2024

Related U.S. Application Data

(60) Provisional application No. 63/424,759, filed on Nov. 11, 2022.

(51) Int. Cl.
*H04L 9/40* (2022.01)
*H04L 9/00* (2022.01)

(52) U.S. Cl.
CPC .............. *H04L 63/062* (2013.01); *H04L 9/50* (2022.05)

(58) Field of Classification Search
CPC ................................ H04L 63/062; H04L 9/50
See application file for complete search history.

(56) References Cited

U.S. PATENT DOCUMENTS

2019/0318102 A1* 10/2019 Araya ................... H04L 9/0897
2019/0356475 A1* 11/2019 Resch ..................... H04L 9/085
2020/0112441 A1* 4/2020 Spiro .................... H04L 9/3247
2021/0218559 A1* 7/2021 Xia ....................... H04L 9/0825
2024/0137388 A1* 4/2024 Kennedy ............... H04L 9/0618

* cited by examiner

*Primary Examiner* — Trong H Nguyen
(74) *Attorney, Agent, or Firm* — Schwegman Lundberg & Woessner, P.A.

(57) ABSTRACT

Various systems and methods for providing a trusted key access broker are described herein. A system may be configured to receive, at a trusted key access broker, from a requestor via a broker application programming interface, a request for a cryptographic key operation, the request associated with attestation evidence data; use the attestation evidence data to validate the requestor; in response to validating the requestor, translate and transmit the request for the cryptographic key operation to one of the plurality of key management systems; receive a response from the one of the plurality of key management systems; and transmit the response to the requestor.

20 Claims, 14 Drawing Sheets

SYSTEMS AND METHODS FOR KEY ACCESS DISTRIBUTION AND MANAGEMENT

CLAIM OF PRIORITY

This patent application claims the benefit of priority to U.S. Provisional Patent Application Ser. No. 63/424,759, entitled "SYSTEMS AND METHODS FOR KEY ACCESS DISTRIBUTION AND MANAGEMENT," filed on Nov. 11, 2022, which is hereby incorporated by reference herein in its entirety.

BACKGROUND

Confidential Computing generally refers to a category of approaches that provides protection of software services, such as through the use of Trusted Execution Environments (TEEs) and attestation. Attestation, as applied in a networked computing setting, is a mechanism that allows a relying party to verify the integrity of a remote software (e.g., executing in a TEE) by evaluating hardware-based evidence generated by the remote software. For instance, at a high level, if the relying party knows the architecture of a distributed software component, it can attest its services.

Edge computing, at a general level, refers to the transition of compute and storage resources closer to endpoint devices (e.g., consumer computing devices, user equipment, etc.), in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
FIG. 1 depicts a simplified system overview for the use cases discussed herein, providing a comparison of trust and identify verification, according to an example.
Figure 1:
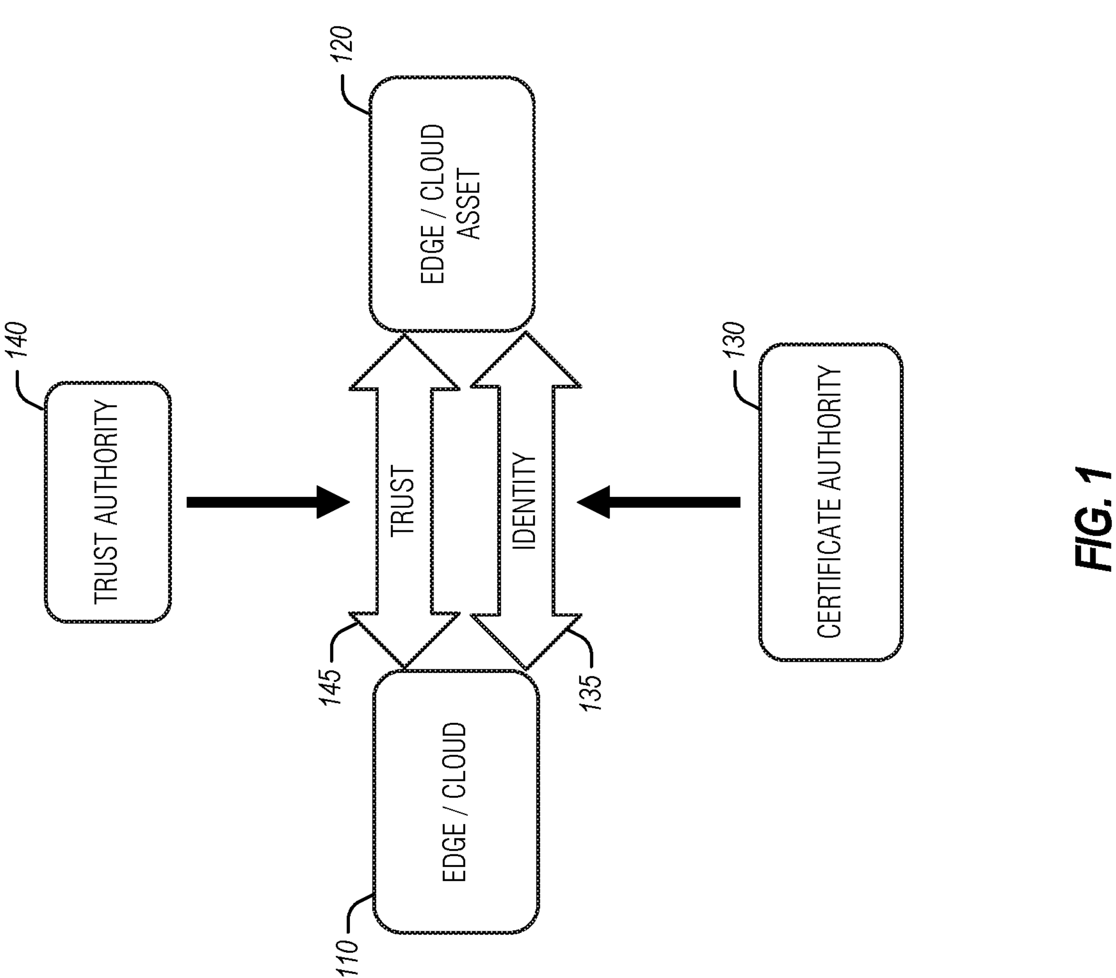

Systems and methods described herein enhance confidential or secure computing through a trusted key access broker that manages key access distribution. The trusted key access broker (TKAB) may be implemented as Software as a Service (SaaS). The TKAB operates to provide an interface between disparate software platforms and key management systems (KMS).

Confidential computing is an emerging industry initiative focused on helping to secure data in use. The efforts can enable encrypted data to be processed in memory while lowering the risk of exposing it to the rest of the system, thereby reducing the potential for sensitive data to be exposed while providing a higher degree of control and transparency for users.

Confidential computing drives a Zero Trust security model and implementing architectures. Zero Trust is a strategic approach to cybersecurity that secures an organization by eliminating implicit trust and continuously validating stages of a digital interaction. The main concept behind the Zero Trust security model is the motto "never trust, always verify," which means that devices should not be trusted by default, even if they are connected to a permissioned network such as a corporate LAN and even if they were previously verified.

The trustworthiness of confidential computing workloads is verified through attestation. Attestation is the process of validating the integrity of a computing device such as a server needed for confidential trusted computing. Attestation may be based on various assets of a computing device. As used herein, a compute "asset" that is the subject of the attestation and trust verification may relate to any number or type of features or entities in or associated with a computing system. This may be, for instance, hardware, firmware, software, network operations, data, a data set, a particular instance of data (e.g., a workload), a particular instance of software (e.g., virtualized components), and similar designated or defined portions thereof. Additionally, an asset that is subject to attestation and trust verification may be used, instantiated, accessed, or verified as part of system operation, management, administration, configuration, or other use cases. Thus, at a broad level, an asset that is subject to trust verification and attestation may be any "thing" in a computing environment that is observable by another entity. For instance, many of the following examples refer to the attestation of a workload as trusted, and performing some operation (e.g., executing the workload, unencrypting data, etc.) as a result of successful attestation. Other attestation use cases for access, retrieval, storage, or transmission of data (or other operations) may also be implemented.

Confidential computing technologies may be deployed with the present techniques to establish trust for a variety of entities and assets, in whatever form that such entities and assets are embodied. For instance, the following approaches can provide a trust authority service that is independent of cloud service providers (CSPs). Among other use cases, this may allow CSPs to be kept out of the trust boundary by executing workloads in Trusted Execution Environments (TEEs), and also verifying such TEEs via attestation.

An attestation service may verify that the workloads are running in genuine TEEs with the correct attributes that meet customer policies. An attestation service may also verify measurements of the workload (e.g., workload metrics).

Workloads require cryptographic keys for confidential computing. Keys are stored in Key Management Systems (KMS). Although some standards such as PKCS11 and KMIP have been defined to improve interoperability between various KMS, many KMS rely on proprietary APIs. This causes complexity of integration and possibly vendor lock-in.

In addition, key security policies are needed to prevent a key to be released to a non-trustworthy client/requestor. Attestation of the requestor before key release is enabled by the systems and methods described herein. There are several types of attestation such as platform integrity and ensuring a workload is running inside a TEE (e.g., Intel® SGX/TDX, ARM® TrustZone, AMD® SEV). To improve confidential computing, KMS are enhanced using the techniques described herein to verify that the 'Requestor' of the key is trustworthy before the key is released. Adding support for existing and new attestation types in popular KMS is not always possible. The systems and techniques described herein address these limitations.

There are different KMS with respective application programming interfaces (API) to access keys they manage. To access different KMS, a Requestor has to support the different APIs to get access to the keys. This is cumbersome and untenable in many cases. Further, due to the sensitivity of the keys/secrets, they have to be delivered in a secure way, which may include keeping the CSP hosting the keys outside the Trust Boundary. This means the policy evaluation and the key release to the Requestor has to happen in a confidential computing environment, and also over a secure channel What is needed is a secure mechanism to store and distribute keys.

The systems and techniques described herein address these problems by providing a unified API for Requestors to use to access disparate key stores and KMS. The policy execution used to determine whether to release the keys and distribute them is run inside a secure environment, such Intel® Software Guard Extensions (SGX) or Intel® Trust Domain Extensions (TDX), ARM® TrustZone, AMD® SEV, or other implementations.

KMS and key policy and distribution engines have latency challenges for some cloud workloads. Also, due to limitations of infrastructure or the design of an IoT or Edge node, accessing KMS every time a key/secret is needed is not possible in certain deployment scenarios. Typically, caching is used to address these concerns. Caching can be either on the disk or in the memory in a multi-tenant cloud computing environment. However, current caching techniques do not guarantee that the key/secret is isolated and protected from system software, network, rouge system administrators, other tenants, etc. This systems and techniques described herein address this problem by caching the keys in distributed hardware security module (dHSM) that is built withing a secure environment. This dHSM is deployed close to the workload that requests the keys and the dHSM and the TKAB service verify the trustworthiness of each other through attestation before they orchestrate the key caching in the dHSM.

In summary, the systems and methods described herein implement attestation-based access control for KMS through the use of a broker service. The broker service, herein referred to as a Trusted Key Access Broker (TKAB) Service, adds a layer between a requesting client of a key and target KMS. This TKAB Service provides a unified and simplified API for different clients to use, therefore, a specific client does not need to support all of the various APIs of target KMSs. The TKAB Service has plugins to support different KMS APIs. The TKAB Service runs in a TEE that attest to an attestation service and it enforces policies for keys. These are customer configurable policies. TKAB can implement a variety of policies that include verifying attestation of the workloads, the platforms/TEE in which these workloads are running, geo-location, etc.

For low-latency and high-performance use cases with customers, the TKAB Service also provides a complementary TEE-based distributed HSM that can run closer to the workloads, providing a secure cache close to the workloads. The TEE-dHSM and the TKAB Service attest to an attestation service, thus providing an independent trustworthiness verification mechanism. These functions and others are described in more detail below.

FIG. 1 depicts a simplified system overview for the use cases discussed herein, providing a comparison of trust and identify verification. As shown, the following SaaS implementation 100 of a Trust Authority (TA) 140 provides remote verification of the trustworthiness for asset 120 used with an edge/cloud deployment 110, including compute assets, based on use of attestation, policies and reputation/risk data. The following SaaS implementation of the TA 140 is operationally independent from the Cloud/Edge infrastructure provider that is hosting confidential compute customer workloads.

In this setting, the TA 140 is an entity that issues digital trust certifications (in the form of, for example, a JWT token (JSON Web Token) or other digital certification), to establish trust verification procedures 145 between the edge/cloud 110 consumer and the edge/cloud asset 120. For instance, the digital certification can certify the trustworthiness of a particular compute asset used to execute a workload for the consumer.

The role of the TA 140 is similar to that of a certificate authority 130 (CA), such as a CA that issues cryptographic digital certificates to establish identity verification procedures 135. However, the role of the TA 140 is to confirm the trust level or trustworthiness of the asset 120. As will be understood, proving trustworthiness is a function of three principles: (1) attestation—which includes verifying the identity of the asset; (2) policy—where a customer can indicate what policy needs to be verified as part of trust evaluation; and (3) reputation—which comes from situation analysis or repudiation data from a third party.

In an example, the TA 140 may be provided from an edge or cloud service implemented in a software as a service (SaaS) model. For instance, the TA 140 can be configured to issue digital trust certification on demand, only if the TA 140 successfully verifies the asset 120 (e.g., a compute asset) based on remote attestation operations, policy validation, and data such as reputation or risk information.

In an example, the TA 140 is operationally independent from the cloud and edge infrastructure service provider that is hosting the confidential computing workloads. This enables delinking of the attestation provider and infrastructure provider.

The following examples refer to the use of a TA configured for verifying the trustworthiness of components using Intel® secure computing technologies, such as TEEs implemented with Intel® SGX and TDX technologies. However, the present approaches are also applicable to a variety of other TEEs and secure computing components from other manufacturers, such as AMD® SEV and ARM® realms. Thus, it will be understood that the following approaches are not limited to deployments with Intel® or x86 technologies.

Figure 2:
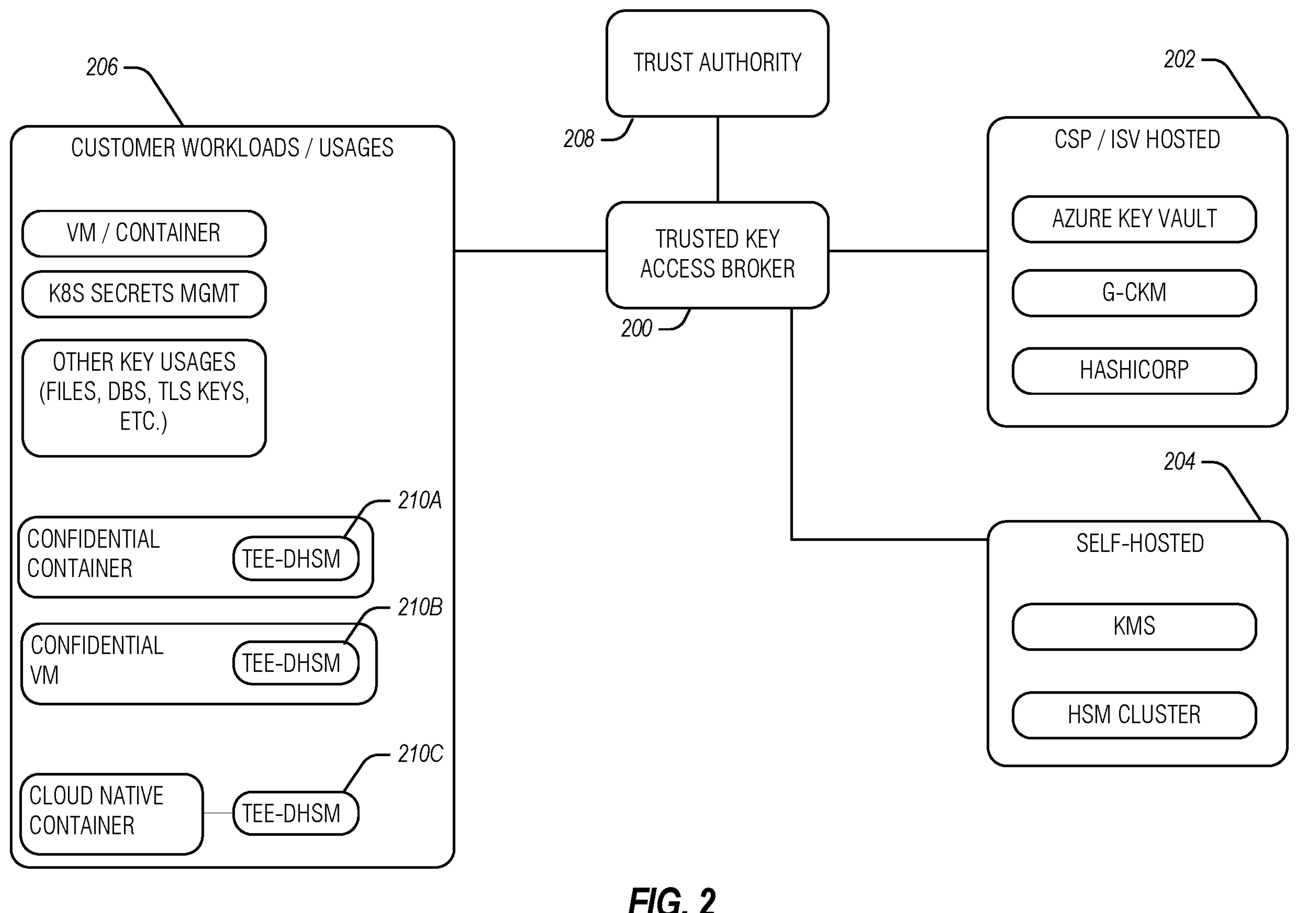
FIG. 2 is a block diagram illustrating an operating environment including a trusted key access broker (TKAB), according to an example.

FIG. 2 is a block diagram illustrating an operating environment including a trusted key access broker (TKAB) 200, according to an example. The TKAB 200 is used to broker key requests to key management systems (KMS) hosted by cloud service provider (CSP)/independent software vendors (ISV) 202 (e.g., Microsoft® Azure key vault, Google® Cloud Key Management, HashiCorp® Vault, etc.) or independent key management services 204 (e.g., Intel® KMS). Customer workloads 206 issue key requests to the TKAB 200 via a unified API. The unified API allows a key requestor to interact with different types of backend KMS, instead of having to interact directly with different KMSs and having to support different KMS APIs. This unified API reduces the complexity of the key request flow. This is especially efficient in Edge and IoT deployment scenarios.

When requesting a key, the customer workload 206 provides an attestation claim. This claim is verified using a trust authority (TA) 208, such as that described in FIG. 1. Policies are enforced based on the attestation of the requesting customer workload 206. TKAB 200 is a broker that performs attestation-based key policy management and enforcement before the key request is forwarded to the KMS (e.g., hosted on 202 or 204). The policy can be extended to support other types of access control to verify the Requestor and protect the keys.

The TKAB 200 may run as a service in TEEs like Intel® SGX and Intel® TDX so policy evaluations and key distributions happen in an isolated environment, keeping the infrastructure provider (CSP) outside the trust boundary. This further enables a Zero Trust Architecture.

Key management systems (KMS) operate to control access to keys stored in secure vaults, such as a hardware security module (HSM). A hardware security module (HSM) is a physical computing device that safeguards and manages digital keys, performs encryption and decryption functions for digital signatures, strong authentication, and other cryptographic functions. These modules traditionally come in the form of a plug-in card or an external device that attaches directly to a computer or network server. A hardware security module contains one or more secure cryptoprocessor chips.

To improve performance and reduce latency, an HSM may be implemented with a distributed model, where distributed HSMs (dHSM) 210A, 201B, 210C are configured to store a portion or all of the keys of a primary HSM. Distributed HSMs 210A-C are synchronized and orchestrated using underlying protocols to ensure data consistency across the dHSMs 210A-C. The TKAB 200 may manage keys stored in dHSMs 210A-C.

Figure 3:
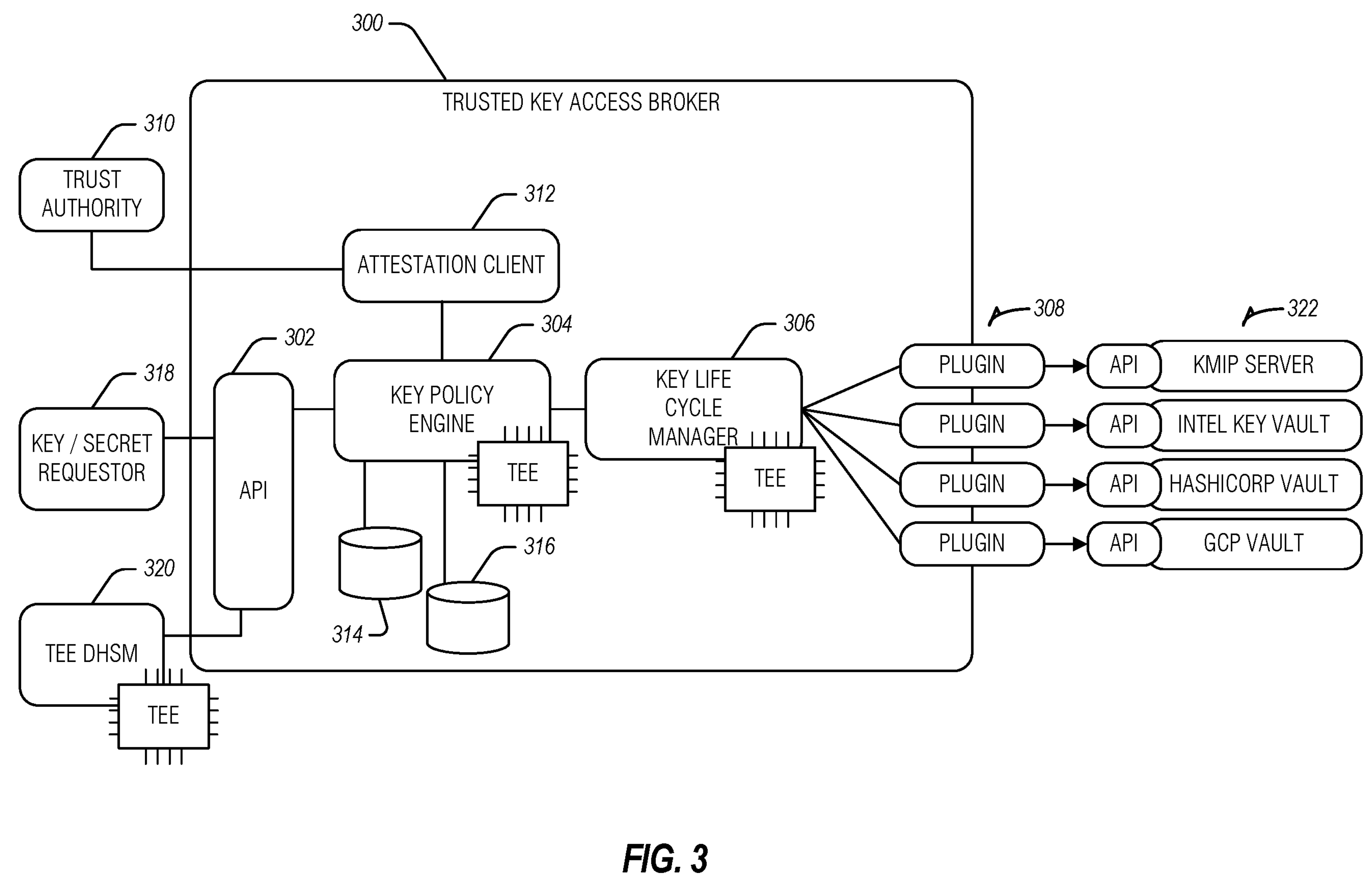
FIG. 3 is a block diagram illustrating components of a trusted key access broker (TKAB), according to an example.

FIG. 3 is a block diagram illustrating components of a trusted key access broker (TKAB) 300, according to an example. The TKAB 300 includes a broker application programming interface (API) 302, a key policy engine 304, a key life cycle manager 306, and one or more key management system (KMS) plugins 308.

The TKAB API 302 provides the interface for a key requestor 318 or distributed HSM 320 to request keys from a KMS 322. The TKAB API 302 may be implemented as a stateless RESTful API. The TKAB API 302 may also provide an interface for administrators to access the TKAB 300 to configure policies, plugins, access logs, or other administrative operations. Access to the TKAB 300 may be authenticated using OAuth or other mechanisms, such as a single sign on (SSO) for unified access and authorization.

The key policy engine 304 manages the policies associated with a key and evaluates the attributes, attestation tokens, security posture, and authorization of the requestor 318 against the policy of the key being requested. If the key policy engine 304 is used to send a challenge to the requestor 318 as part of the attestation based on the policy associated the requested key, the key policy engine 304 will collect the received evidence from the requestor 318 and issue a call to a trust authority 310 to verify the evidence.

An attestation client 312 may execute inside the TKAB 300 to interface with the trust authority 310 and attestation services when requested by key policy engine 304. The key policy engine 304 retrieves policies from a policy store 314 and based on the key policy associated with a key, the key policy engine 304 selects the corresponding trust authority 310 and attestation service for evidence verification.

The key life cycle manager 306 is a proxy to communicate to the KMS 322 on the backend manage key life cycles, such as to create, delete, recycle keys, etc. The key life cycle manager 306 interfaces with KMS 322 using a corresponding KMS plugin 308.

KMS plugins 308 provide an interface to communicate with different KMS 322. The plugins 308 are modularized such that it is easy for the TKAB 300 to add, remove, or replace plugins to support different backend KMS platforms. The use of the plugins 308 is concealed from the requestor 318, who only has to interface with the TKAB API 302.

Additionally, the TKAB 300 includes an immutable ledger 316. The immutable ledger 316 may be implemented using blockchain technology or other distributed ledger technology. Aspects of the TKAB including the Requestor info, the request, the attestation or trust authority token, the policies associated with the request, the evaluation of the policies, the services evaluated, etc., can be logged into the immutable ledger 316. This can provide auditable proof to the end customer about which applications were accessed and by whom, for which keys, etc.

Overall, the trust authority 310 provides a trust as a service (TaaS) architecture. A variety of use cases may be provided for the TaaS architecture. For instance, in an enterprise setting, trust verification may be used prior to releasing keys to Confidential Compute workloads (e.g., in connection with AI Model Inferences). For ISVs, a TaaS provides privacy-preserving data distribution (e.g., with encrypted messaging, or other apps and services which require end-to-end security). For multi-party computing, TaaS may be used to provide trusted federated machine learning. In the case of Cloud Service Providers (CSPs), TaaS may be used to provide trust verification of telecommunications/communication service providers (CoSPs) infrastructure components for the CSP's use.

In a blockchain setting, Node/Object verification may be performed by a TaaS before admitting them to blockchain networks. For example, trust verification could be implemented at a client, server, or other entities wanting to become part of a blockchain network. Consider a use case with a customer, requiring an entity to have certain security properties before joining the blockchain network. The TaaS architecture can provide security properties, while existing systems in the network validate the properties. Thus, if an entity is convinced that a new actor is trusted and verified, then the new actor can become a trusted part of the network.

Figure 4:
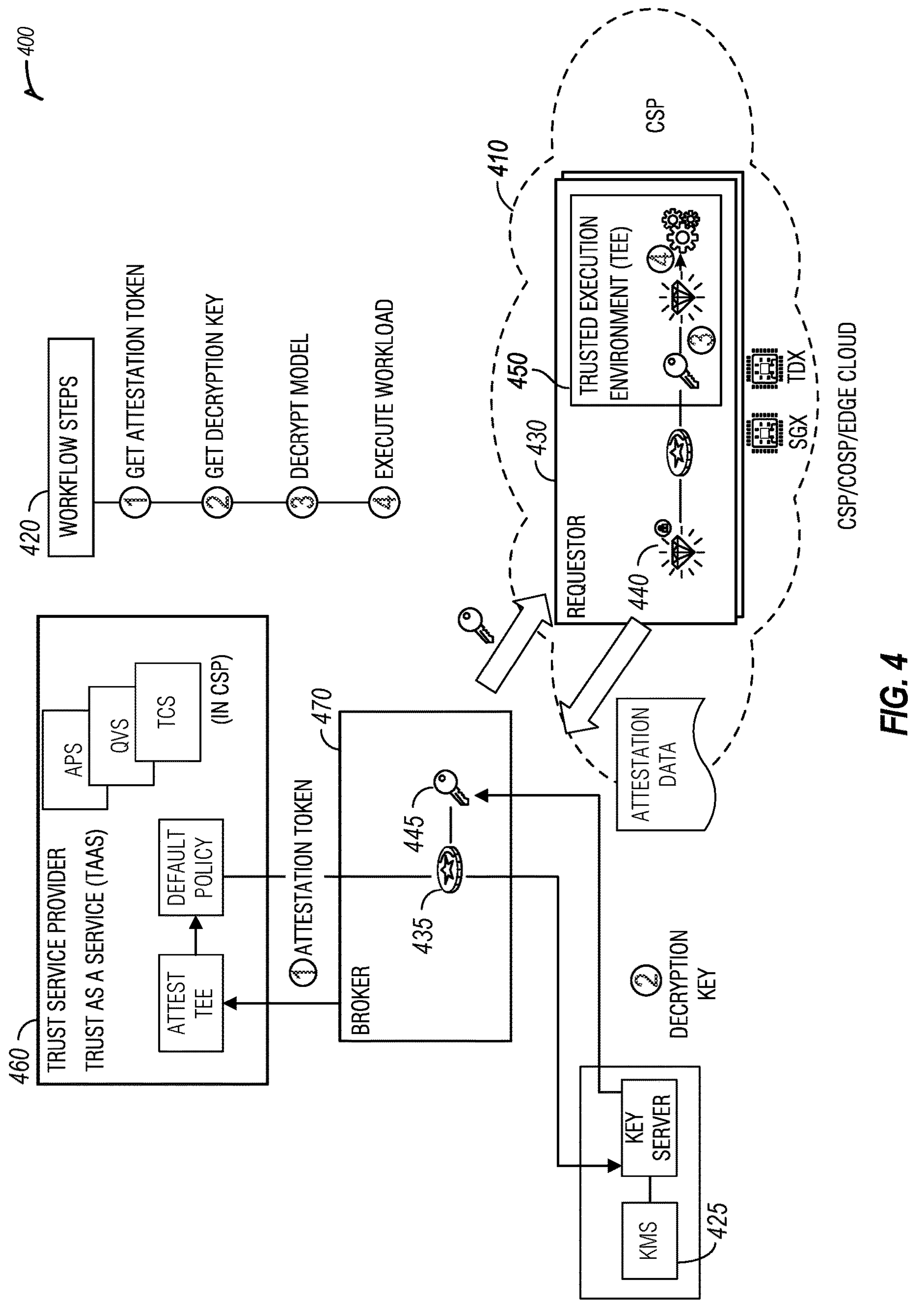
FIG. 4 illustrates a use case for trust verification for a key release procedure at a cloud service provider (CSP), according to an example.

FIG. 4 illustrates a use case for trust verification for a key release procedure 400 at a cloud service provider (CSP) 410, according to an example. Here, the CSP 410 uses confidential computing technologies (e.g., including encryption tied to an attestation-protected key) to securely perform a workflow 420 with trust verification.

In this setting, the CSP 410 may need to perform operations of the workflow 420 before executing a workload 440 with a decrypted model in a trusted execution environment 450, on behalf of an end customer 430. The workload 440 is executed after obtaining an attestation token 435 from a TaaS instance at a trust service provider 460 (e.g., operating at another CSP), and using the attestation token 435 to obtain a decryption key 445 that decrypts the model.

In an embodiment, a TKAB 470 (e.g., TKAB 300) performs the operations to obtain the attestation token 435 from a TaaS offered by a trust service provider 460, and then performs the operations to obtain the key 445 from the KMS 425 on behalf of the requestor 430.

Figure 5:
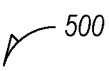
FIG. 5 illustrates a flowchart of a workflow for handling key requests, according to an example.
Figure 5:
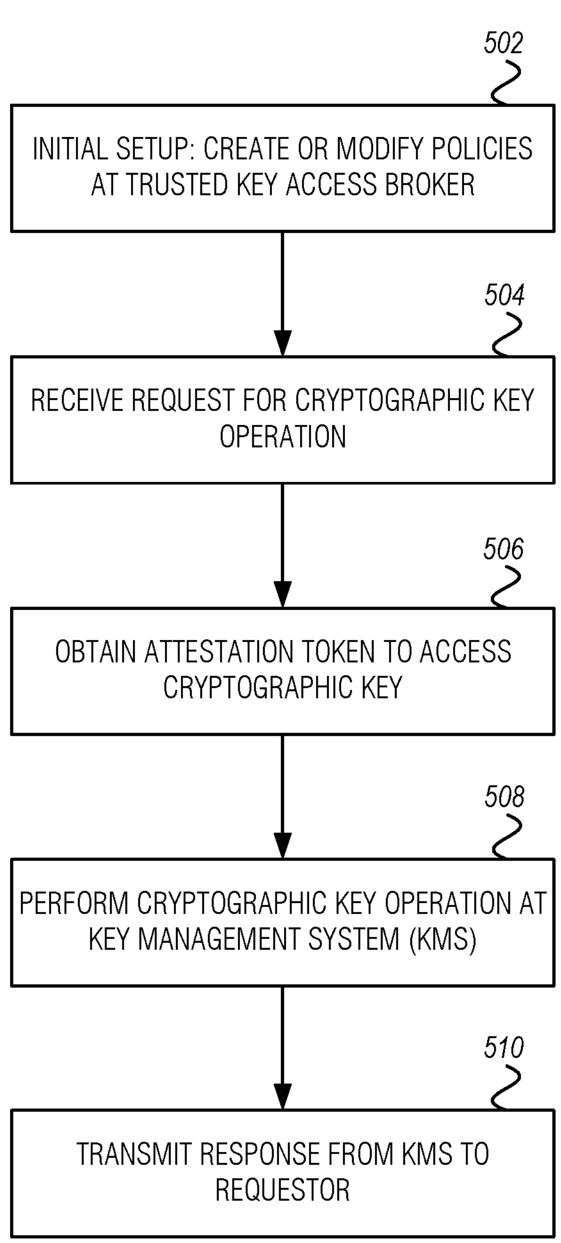

FIG. 5 illustrates a flowchart of a workflow 500 for handling key requests, according to an example. At operation 502, in an initial setup: an administrative user creates or modifies policies at a trusted key access broker (TKAB). At operation 504, a request is received from a workload, where the request is for a cryptographic key operation. The workload may also attest to the TKAB with attestation evidence data in the request. At operation 506, the TKAB uses the attestation evidence data from the workload and interfaces with a trust authority to obtain an attestation token after appraisal of the attestation evidence and the policy. At operation 508, the TKAB interfaces with a key management system (KMS) to perform a cryptographic key operation. The TKAB may use a plugin to interface with an API at the KMS. A response is received from the KMS.

At operation 510, the TKAB provides a response to the requesting workload. The response may include a cryptographic key or the response may indicate a status of a key operation (e.g., to add or delete a key). The requesting workload may be executing in a TEE as part of a confidential computing deployment. Alternatively, the requester may be a distributed hardware security module (dHSM) that is looking to fetch a key for a local cache at the dHSM.

Figure 6:
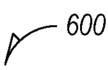
FIG. 6 illustrates a flowchart of a method for handling key requests, according to an example.
Figure 6:
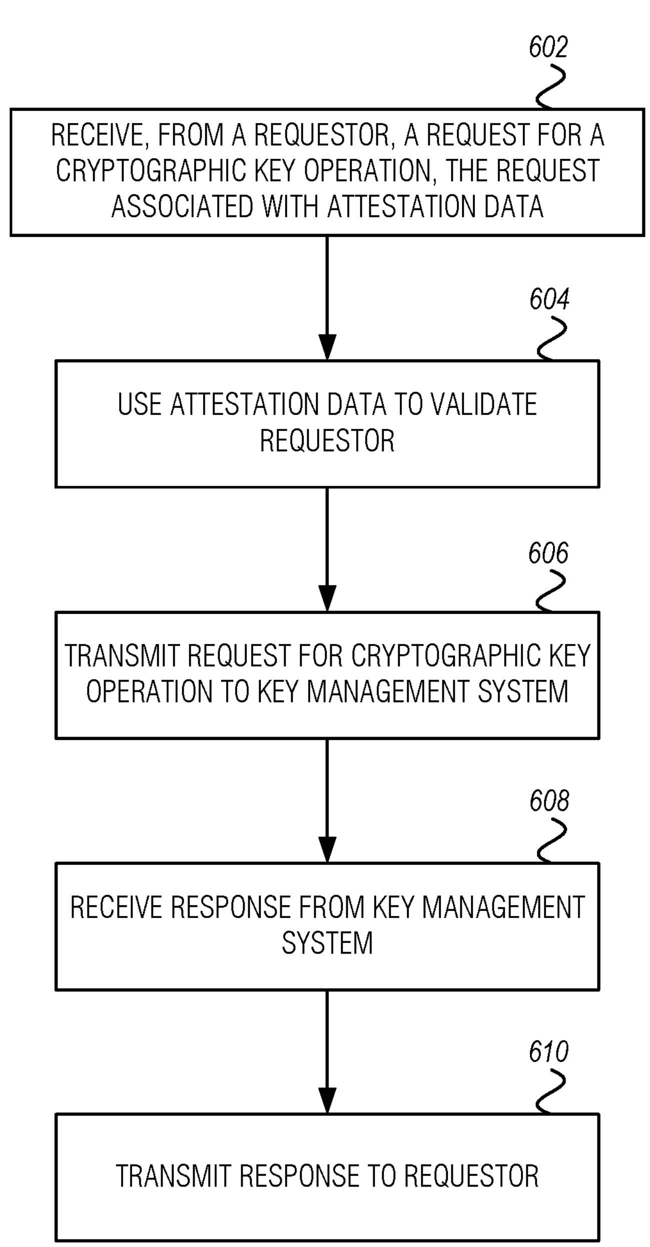

FIG. 6 illustrates a flowchart of a method 600 for handling key requests, according to an example. The method 600 may be executed at an edge, cloud, or other networked device that is providing a trusted key access broker. The method 600 may be executed at a system, such as a TKAB 300, or other systems described herein.

At 602, a request for a cryptographic key operation is received from a requestor at a trusted key access broker. The request is received via a broker application programming interface (API). In an embodiment, the broker API is generic (e.g., agnostic) to a plurality of key management systems. In other words, the API provides a common interface to any requestor, regardless of which KMS the requestor intends to access. In an embodiment, the request for the cryptographic key operation includes a request to read, create, modify, or delete a cryptographic key.

Also, the request includes or is associated with attestation evidence data. The attestation evidence data may be included as part of the same message as the request or be received in a separate message from the request. If received separately from the request, the attestation evidence data may be associated with the request by a shared identifier (e.g., the request may have a unique request identifier, which is in the message with the attestation evidence data to link the two together). In an embodiment, to use the attestation evidence data to validate the requestor, the trusted key access broker to interface with a trust authority. In a further embodiment, the trust authority operates using a trust as a service (TaaS) architecture.

In an embodiment, the plurality of key management systems includes at least one key management system provided by a cloud service provider and at least one key management system provided by a private host.

In an embodiment, the trusted key access broker is executed in a trusted execution environment of the system.

At 604, the attestation evidence data is used to validate the requestor.

At 606, in response to validating the requestor, the request for the cryptographic key operation is translated and transmitted to one of the plurality of key management systems. In an embodiment, to transmit the request for the cryptographic key operation to one of the plurality of key management systems, the trusted key access broker is to determine a key management system application programming interface (API) to use when accessing the one of the plurality of key management systems and access the one of the plurality of key management systems to transmit the request for the cryptographic key operation.

At 608, a response is received from the one of the plurality of key management systems. In an embodiment, the response includes a cryptographic key. In an embodiment, the response includes an indication of a successful operation on a cryptographic key.

At 610, the response is transmitted to the requestor.

In an embodiment, the method 600 includes storing a transaction log of the request for the cryptographic key operation in an immutable ledger (e.g., a blockchain).

Example Edge Computing Architectures

Although the previous discussion was provided with reference to specific networked compute deployments, it will be understood that the TKAB and TaaS instances may be implemented at any number of devices that access services from the "cloud," devices that access services from the "edge cloud," or devices that access services from the "data center cloud." In particular, for edge devices to successfully access any services in the edge cloud, the edge device has to be attested as secure.

Accordingly, the present techniques provide a framework to enable attestation of the security portion of the edge before services are fulfilled at the edge. Further, the present techniques provide a continuum of verification, from data center to cloud to edge.

Figure 7:
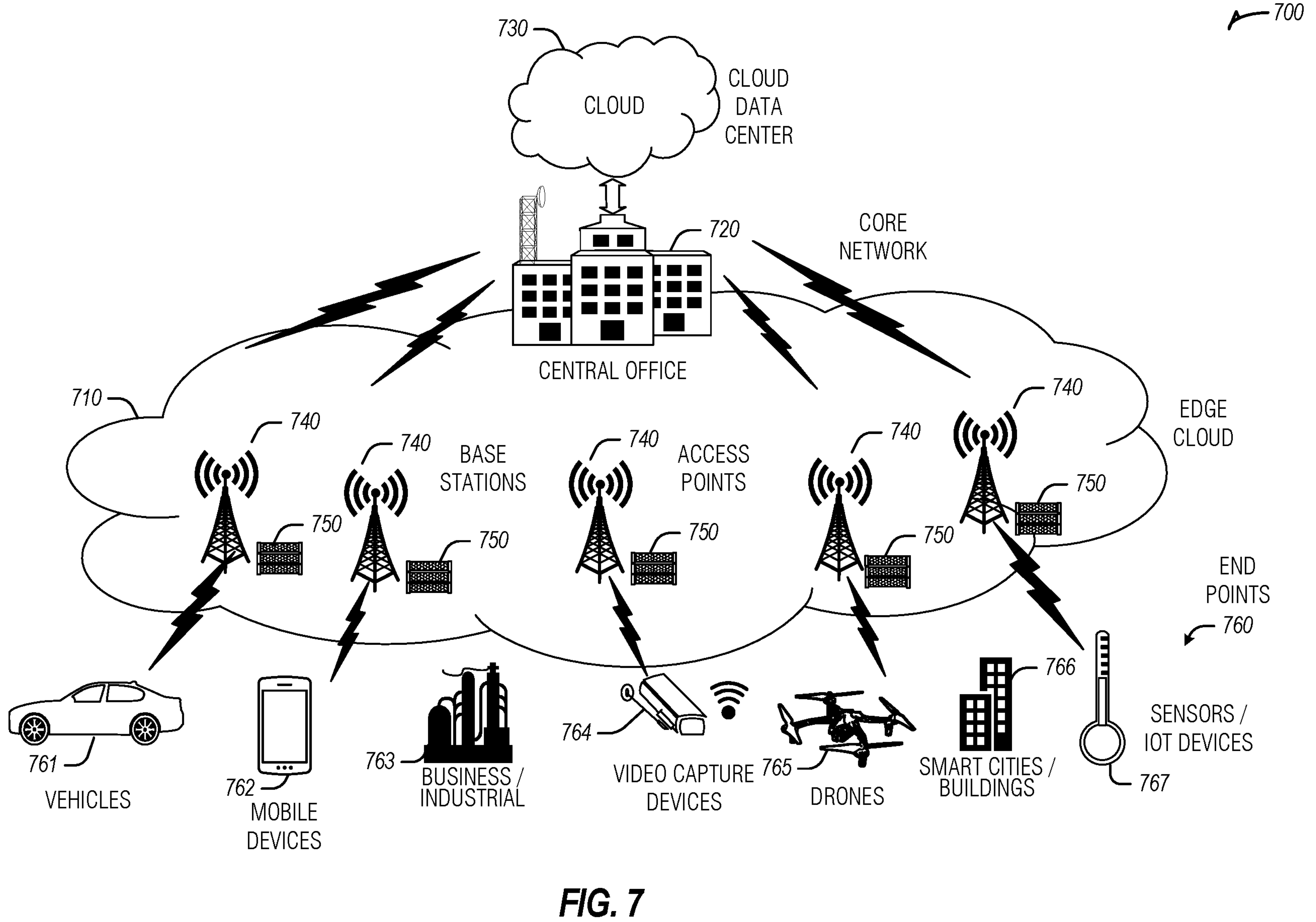
FIG. 7 illustrates an overview of an edge cloud configuration for edge computing, according to an example.

FIG. 7 is a block diagram 700 showing an overview of a configuration for edge computing, which includes a layer of processing referenced in many of the current examples as an "edge cloud." As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as “near edge,” “close edge,” “local edge,” “middle edge,” or “far edge” layers, depending on latency, distance, and timing characteristics.

Edge computing is a developing paradigm where computing is performed at or closer to the “edge” of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be “moved” to the data, as well as scenarios in which the data will be “moved” to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 7, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application-Layer data is typically less time-critical and may be stored and processed in a remote cloud data-center.

Figure 8:
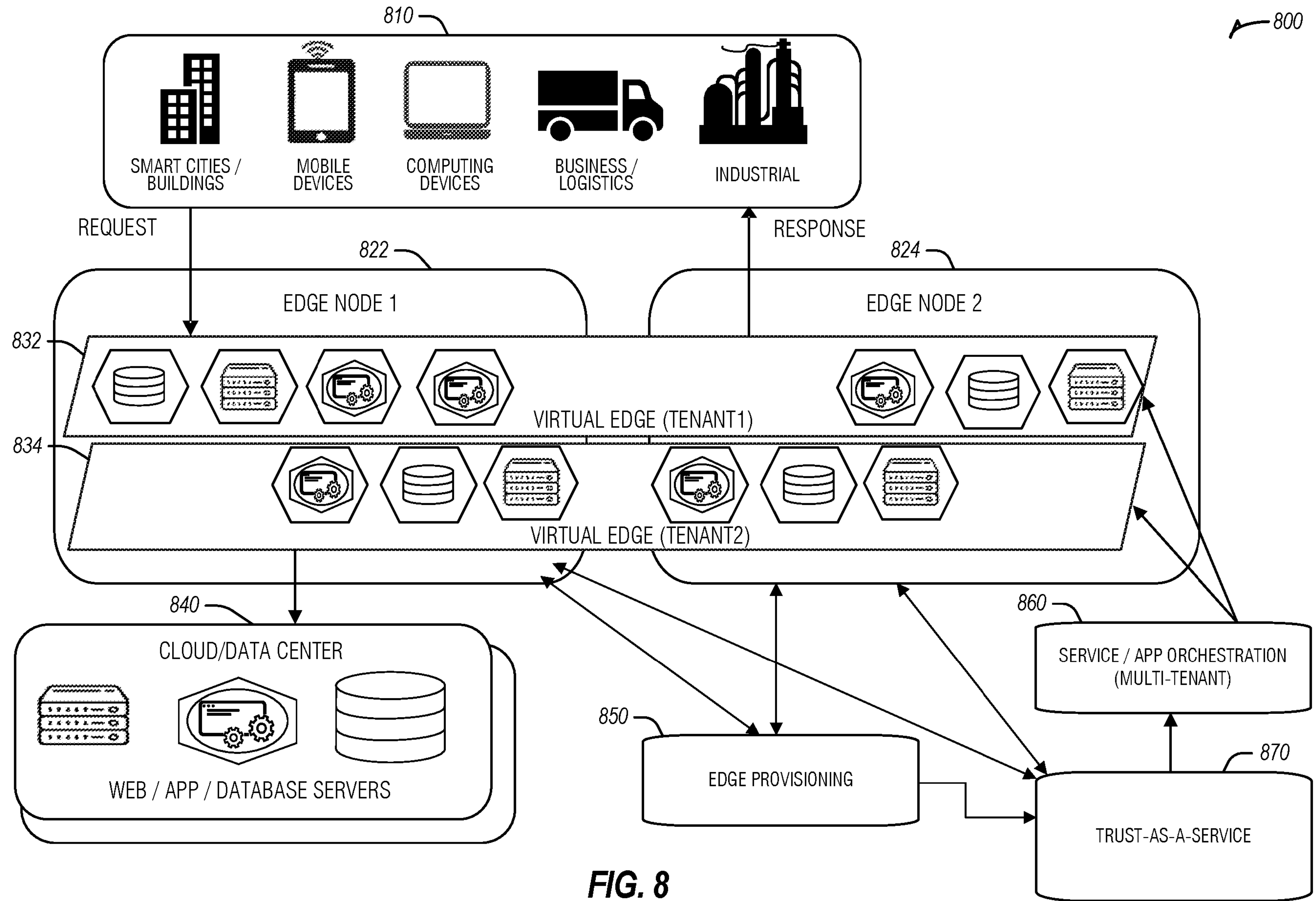
FIG. 8 illustrates deployment and orchestration for virtual edge configurations across an edge-computing system operated among multiple edge nodes and multiple tenants, according to an example.

FIG. 8 illustrates deployment and orchestration for virtual edge configurations across an edge computing system operated among multiple edge nodes and multiple tenants. Specifically, FIG. 8 depicts coordination of a first edge node 822 and a second edge node 824 in an edge computing system 800, to fulfill requests and responses for various client endpoints 810 (e.g., smart cities/building systems, mobile devices, computing devices, business/logistics systems, industrial systems, etc.), which access various virtual edge instances. The virtual edge instances (or virtual edges) provide edge compute capabilities and processing in an edge cloud, with access to a cloud/data center 840 for higher-latency requests for websites, applications, database servers, etc. Thus, the edge cloud enables coordination of processing among multiple edge nodes for multiple tenants or entities.

In the example of FIG. 8, these virtual edge instances include a first virtual edge 832, offered to a first tenant (Tenant 1), which offers a first combination of edge storage, computing, and services; and a second virtual edge 834, offering a second combination of edge storage, computing, and services, to a second tenant (Tenant 2). The virtual edge instances 832, 834 are distributed among the edge nodes 822, 824, and may include scenarios in which a request and response are fulfilled from the same or different edge nodes. The configuration of edge nodes 822, 824 to operate in a distributed yet coordinated fashion occurs based on edge provisioning functions 850. The functionality of the edge nodes 822, 824 to provide coordinated operation for applications and services, among multiple tenants, occurs based on orchestration functions 860.

It should be understood that some of the devices in 810 are multi-tenant devices where Tenant 1 may function within a Tenant1 ‘slice’ while a Tenant2 may function within a Tenant2 ‘slice’ (and, in further examples, additional or sub-tenants may exist; and a tenant may even be specifically entitled and transactionally tied to a specific set of features or to specific hardware features). A trusted multi-tenant device may further contain a tenant-specific cryptographic key such that the combination of a key and a slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS (function as a service) engines, servlets, servers, or other computation abstraction may be partitioned according to a DICE layering and fan-out structure to support a RoT context. Accordingly, the respective RoTs spanning devices in 810, 822, and 840 may coordinate the establishment of a distributed trusted computing base (DTCB) such that a tenant-specific virtual trusted secure channel linking elements end-to-end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

As an example, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 8. An orchestrator may use a DICE layering and fan-out construction to create a root of trust context that is tenant specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations (or, respective computing systems and resources which are co-owned or co-managed by multiple owners).

For instance, edge nodes 822, 824 may implement the use of containers, such as with the use of a container "pod" 826, 828 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 832, 834 are partitioned according to the needs of respective containers.

With the use of container pods, a pod controller oversees the partitioning and allocation of containers and resources. The pod controller receives instructions from an orchestrator (e.g., performing orchestration functions 860) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of a respective pod of containers. If a tenant-specific pod has a tenant-specific pod controller, there may be a shared pod controller that consolidates resource allocation requests to avoid typical resource starvation situations. Further controls may be provided to ensure the attestation and trustworthiness of the pod and pod controller. For instance, the orchestrator 860 may provision an attestation verification policy to local pod controllers that perform attestation verification. If an attestation satisfies a policy for a first tenant pod controller but not a second tenant pod controller, then the second pod may be migrated to a different edge node that does satisfy it. Alternatively, the first pod may be allowed to execute and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to a tenant (aside from the execution of virtualized network functions).

Within the edge cloud, a first edge node 822 (e.g., operated by a first owner) and a second edge node 824 (e.g., operated by a second owner) may operate or respond to a container orchestrator to coordinate the execution of various applications within the virtual edge instances offered for respective tenants. For instance, the edge nodes 822, 824 may be coordinated based on edge provisioning functions 850, while the operation of the various applications is coordinated with orchestration functions 860.

Various system arrangements may provide an architecture that treats VMs, Containers, and Functions equally in terms of application composition (and resulting applications are combinations of these three ingredients). An ingredient may involve the use of one or more accelerator (e.g., FPGA, ASIC) components as a local backend. In this manner, applications can be split across multiple edge owners, coordinated by an orchestrator.

Figure 9:
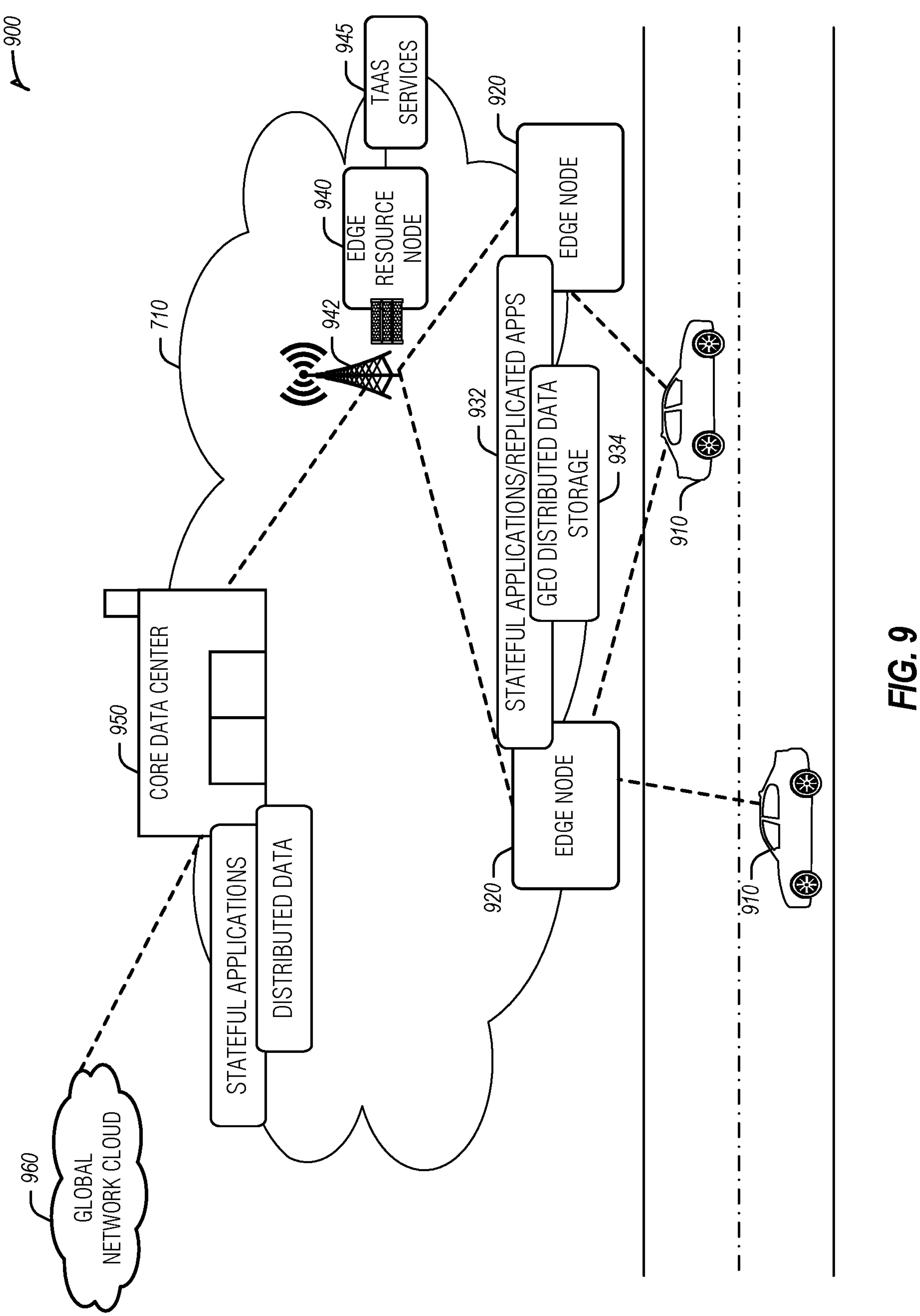
FIG. 9 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 9 shows a simplified vehicle compute and communication use case involving mobile access to applications in an edge computing system 900 that implements an edge cloud 710 connected to Trust-as-a-service instances 945. In this use case, a client compute node 910 may be embodied as in-vehicle compute systems (e.g., in-vehicle navigation and/or infotainment systems) located in corresponding vehicles that communicate with the edge gateway nodes 920 during traversal of a roadway. For instance, edge gateway nodes 920 may be located in roadside cabinets, which may be placed along the roadway, at intersections of the roadway, or other locations near the roadway. As a vehicle traverses along the roadway, the connection between its client compute node 910 and a particular edge gateway node 920 may propagate to maintain a consistent connection and context for the client compute node 910. Each of the edge gateway nodes 920 includes some processing and storage capabilities and, as such, some processing and/or storage of data for the client compute nodes 910 may be performed on one or more of the edge gateway nodes 920.

Edge gateway nodes 920 may communicate with one or more edge resource nodes 940, which are illustratively embodied as compute servers, appliances or components located at or in a communication base station 942 (e.g., a base station of a cellular network). As discussed above, an edge resource node 940 includes some processing and storage capabilities, and, as such, some processing and/or storage of data for the client compute nodes 910 may be performed on the edge resource node 940. For example, the processing of data that is less urgent or important may be performed by the edge resource node 940, while the processing of data that is of a higher urgency or importance may be performed by edge gateway devices or the client nodes themselves (depending on, for example, the capabilities of a component). Further, various wired or wireless communication links (e.g., fiber optic wired backhaul, 5G wireless links) may exist among the edge nodes 920, edge resource node(s) 940, core data center 950, and network cloud 960.

The edge resource node(s) 940 also communicate with the core data center 950, which may include compute servers, appliances, and/or other components located in a central location (e.g., a central office of a cellular communication network). The core data center 950 may provide a gateway to the global network cloud 960 (e.g., the Internet) for the edge cloud 710 operations formed by the edge resource node(s) 940 and the edge gateway nodes 920. Additionally, in some examples, the core data center 950 may include an amount of processing and storage capabilities and, as such, some processing and/or storage of data for the client compute devices may be performed on the core data center 950 (e.g., processing of low urgency or importance, or high complexity). The edge gateway nodes 920 or the edge resource nodes 940 may offer the use of stateful applications 932 and a geographically distributed data storage 934 (e.g., database, data store, etc.).

In further examples, FIG. 9 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 920, some others at the edge resource node 940, and others in the core data center 950 or the global network cloud 960.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 10:
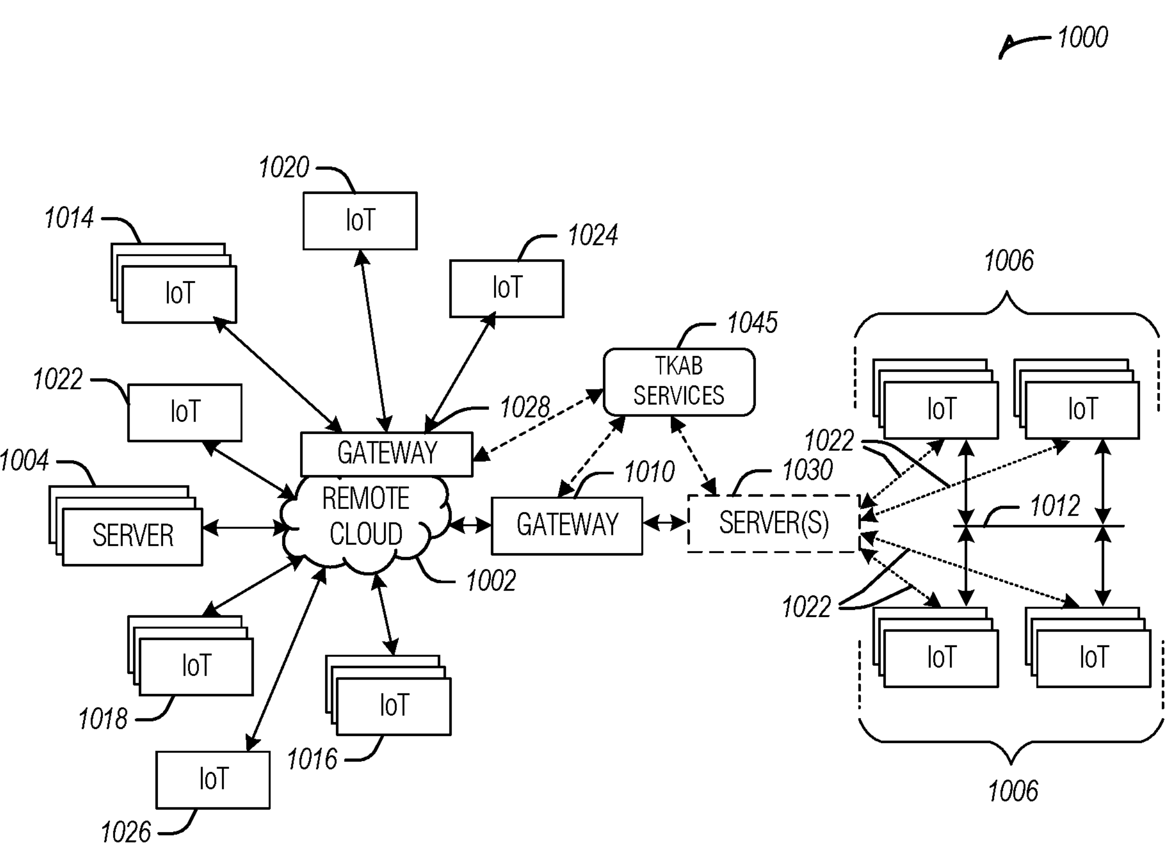
FIG. 10 illustrates a block diagram depicting deployment and communications among several Internet of Things (IoT) devices, according to an example.

As a more detailed illustration of an Internet of Things (IoT) network, FIG. 10 illustrates a drawing of a cloud or edge computing network 1000, in communication with several IoT devices and a TKAB instance 1045. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 10, the network 1000 may represent portions of the Internet or may include portions of a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 406, or other subgroups, may be in communication within the network 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as remote cloud 1002; the IoT devices may also use one or more servers 1030 to facilitate communication within the network 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the network 1000.

In an example embodiment, the network 1000 can further include or be communicatively coupled to an Trust-a-a-Service instance or deployment configured to perform trust attestation operations within the network 1000, such as that discussed above.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. The IoT devices may be in communication with other IoT devices, with servers 1004, with another IoT device or system, another edge computing or "fog" computing system, or a combination therein. The groups of IoT devices may be deployed in various residential, commercial, and industrial settings (including in both private or public environments).

As may be seen from FIG. 10, a large number of IoT devices may be communicating through the network 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 1014 or the traffic control group 1006, may be equipped to communicate with other IoT devices as well as with the network 1000. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or an IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, a LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of them. Furthermore, the proper components of infrastructure and resource-based trust and service indices may be inserted to improve the data integrity, quality, assurance, and deliver a metric of data confidence.

Example Computing Devices

Figure 11:
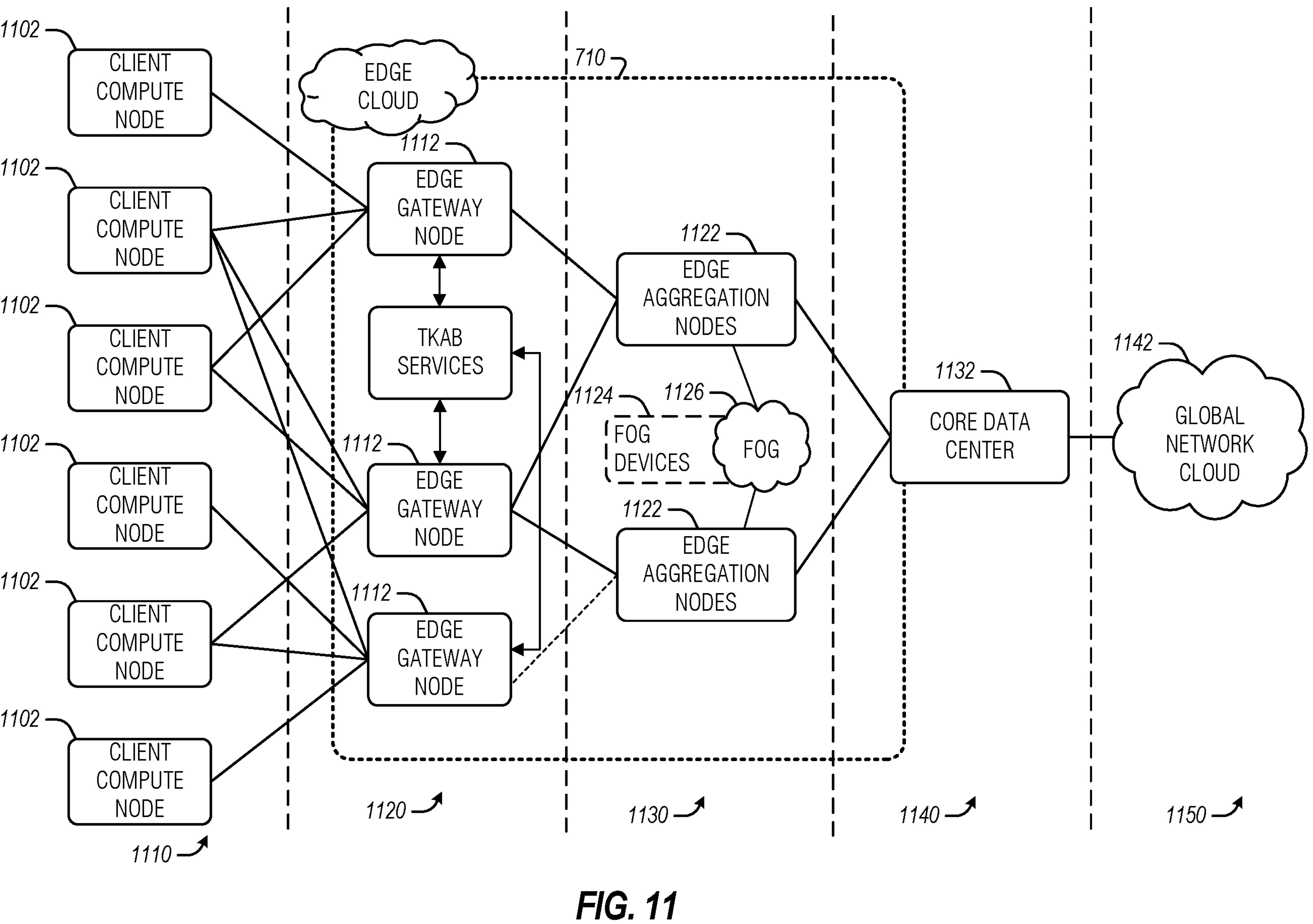
FIG. 11 illustrates an overview of layers of distributed compute deployed among an edge computing system, according to an example.

At a more generic level, an edge computing system may be described to encompass any number of deployments operating in the edge cloud 710, which provide coordination from client and distributed computing devices. FIG. 11 provides a further abstracted overview of layers of distributed compute deployed among an edge computing environment for purposes of illustration.

FIG. 11 generically depicts an edge computing system for providing edge services and applications to multi-stakeholder entities, as distributed among one or more client compute nodes 1102, one or more edge gateway nodes 1112, one or more edge aggregation nodes 1122, one or more core data centers 1132, and a global network cloud 1142, as distributed across layers of the network. The implementation of the edge computing system may be provided at or on behalf of a telecommunication service provider ("telco" or "TSP"), internet-of-things service provider, a cloud service provider (CSP), enterprise entity, or any other number of entities. Various forms of wired or wireless connections may be configured to establish connectivity among the nodes 1102, 1112, 1122, 1132, including interconnections among such nodes (e.g., connections among edge gateway nodes 1112, and connections among edge aggregation nodes 1122). Such connectivity and federation of these nodes may be assisted with the use of TKAB services, as discussed herein.

A node or device of the edge computing system is located at a particular layer corresponding to layers 1110, 1120, 1130, 1140, and 1150. For example, the client compute nodes 1102 are located at an endpoint layer 1110, while the edge gateway nodes 1112 are located at an edge devices layer 1120 (local level) of the edge computing system. Additionally, the edge aggregation nodes 1122 (and/or fog devices 1124, if arranged or operated with or among a fog networking configuration 1126) are located at a network access layer 1130 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of a fog may be integrated into an edge computing architecture.

The core data center 1132 is located at a core network layer 1140 (e.g., a regional or geographically-central level), while the global network cloud 1142 is located at a cloud data center layer 1150 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1132 may be located within, at, or near the edge cloud 710.

Although an illustrative number of client compute nodes 1102, edge gateway nodes 1112, edge aggregation nodes 1122, core data centers 1132, and global network clouds 1142 are shown in FIG. 11, it should be appreciated that the edge computing system may include more or fewer devices or systems at a layer. Additionally, as shown in FIG. 11, the number of components of a layer 1110, 1120, 1130, 1140, and 1150 generally increases at each lower level (i.e., when moving closer to endpoints). As such, one edge gateway node 1112 may service multiple client compute nodes 1102, and one edge aggregation node 1122 may service multiple edge gateway nodes 1112.

Consistent with the examples provided herein, a client compute node 1102 may be embodied as any type of end point component, device, appliance, or "thing" capable of communicating as a producer or consumer of data. Further, the label "node" or "device" as used in the edge computing system 1100 does not necessarily mean that such node or device operates in a client or minion/follower/agent role; rather, any of the nodes or devices in the edge computing system 1100 refer to individual entities, nodes, or subsystems which include discrete or connected hardware or software configurations to facilitate or use the edge cloud 710.

As such, the edge cloud 710 is formed from network components and functional features operated by and within the edge gateway nodes 1112 and the edge aggregation nodes 1122 of layers 1120, 1130, respectively. The edge cloud 710 may be embodied as any type of network that provides edge computing and/or storage resources which are proximately located to radio access network (RAN) capable endpoint devices (e.g., mobile computing devices, IoT devices, smart devices, etc.), which are shown in FIG. 11 as the client compute nodes 1102. In other words, the edge cloud 710 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 710 may form a portion of or otherwise provide an ingress point into or across a fog networking configuration 1126 (e.g., a network of fog devices 1124, not shown in detail), which may be embodied as a system-level horizontal and distributed architecture that distributes resources and services to perform a specific function. For instance, a coordinated and distributed network of fog devices 1124 may perform computing, storage, control, or networking aspects in the context of an IoT system arrangement. Other networked, aggregated, and distributed functions may exist in the edge cloud 710 between the cloud data center layer 1150 and the client endpoints (e.g., client compute nodes 1102). Some of these are discussed in the following sections in the context of network functions or service virtualization, including the use of virtual edges and virtual services which are orchestrated for multiple stakeholders.

The edge gateway nodes 1112 and the edge aggregation nodes 1122 cooperate to provide various edge services and security to the client compute nodes 1102. Furthermore, because a client compute node 1102 may be stationary or mobile, a edge gateway node 1112 may cooperate with other edge gateway devices to propagate presently provided edge services and security as the corresponding client compute node 1102 moves about a region. To do so, the edge gateway nodes 1112 and/or edge aggregation nodes 1122 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 12 and 13. An edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other devices or systems capable of performing the described functions.

Figure 12:
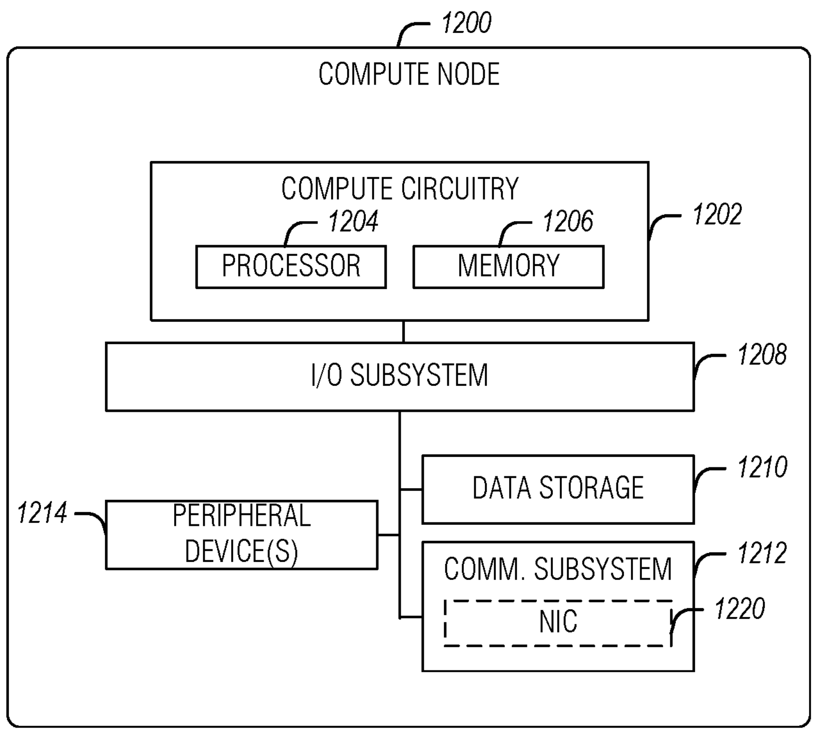
FIG. 12 illustrates an overview of example components deployed at a compute node system, according to an example.

In the simplified example depicted in FIG. 12, an edge compute node 1200 includes a compute engine (also referred to herein as "compute circuitry") 1202, an input/output (I/O) subsystem 1208, data storage 1210, a communication circuitry subsystem 1212, and, optionally, one or more peripheral devices 1214. In other examples, a compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1200 may be embodied as any type of engine, device, or collection of devices capable of performing various compute functions. In some examples, the compute node 1200 may be embodied as a single device such as an integrated circuit, an embedded system, a field-programmable gate array (FPGA), a system-on-a-chip (SOC), or other integrated system or device. In the illustrative example, the compute node 1200 includes or is embodied as a processor 1204 and a memory 1206. The processor 1204 may be embodied as any type of processor capable of performing the functions described herein (e.g., executing an application). For example, the processor 1204 may be embodied as a multi-core processor(s), a microcontroller, a processing unit, a specialized or special purpose processing unit, or other processor or processing/controlling circuit. In some examples, the processor 1204 may be embodied as, include, or be coupled to an FPGA, an application-specific integrated circuit (ASIC), reconfigurable hardware or hardware circuitry, or other specialized hardware to facilitate performance of the functions described herein. Also in some examples, the processor 1204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 1204 may work in coordination with each other to execute many types of operations and instructions within and on behalf of the compute node 1200.

The main memory 1206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1206 may be integrated into the processor 1204. The main memory 1206 may store various software and data used during operation such as one or more applications, data operated on by the application(s), libraries, and drivers.

The compute circuitry 1202 is communicatively coupled to other components of the compute node 1200 via the I/O subsystem 1208, which may be embodied as circuitry and/or components to facilitate input/output operations with the compute circuitry 1202 (e.g., with the processor 1204 and/or the main memory 1206) and other components of the compute circuitry 1202. For example, the I/O subsystem 1208 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1208 may form a portion of a system-on-a-chip (SoC) and be incorporated, along with one or more of the processor 1204, the main memory 1206, and other components of the compute circuitry 1202, into the compute circuitry 1202.

The one or more illustrative data storage devices 1210 may be embodied as any type of device configured for short-term or long-term storage of data such as, for example, memory devices and circuits, memory cards, hard disk drives, solid-state drives, or other data storage devices. A data storage device 1210 may include a system partition that stores data and firmware code for the data storage device 1210. A data storage device 1210 may also include one or more operating system partitions that store data files and executables for operating systems depending on, for example, the type of compute node 1200.

The communication circuitry 1212 may be embodied as any communication circuit, device, or collection thereof, capable of enabling communications over a network between the compute circuitry 1202 and another compute device (e.g., an edge gateway node 1112 of the edge computing system 1100). The communication circuitry 1212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 1212 includes a network interface controller (NIC) 1220, which may also be referred to as a host fabric interface (HFI). The NIC 1220 may be embodied as one or more add-in-boards, daughter cards, network interface cards, controller chips, chipsets, or other devices that may be used by the compute node 1200 to connect with another compute device (e.g., an edge gateway node 1112). In some examples, the NIC 1220 may be embodied as part of a system-on-a-chip (SoC) that includes one or more processors or included on a multichip package that also contains one or more processors. In some examples, the NIC 1220 may include a local processor (not shown) and/or a local memory and storage (not shown) that are local to the NIC 1220. In such examples, the local processor of the NIC 1220 (which can include general-purpose accelerators or specific accelerators) may be capable of performing one or more of the functions of the compute circuitry 1202 described herein. Additionally, or alternatively, the local memory of the NIC 1220 may be integrated into one or more components of the client compute node at the board level, socket level, chip level, and/or other levels.

Additionally, in some examples, a compute node 1200 may include one or more peripheral devices 1214. Such peripheral devices 1214 may include any type of peripheral device found in a compute device or server such as audio input devices, a display, other input/output devices, interface devices, and/or other peripheral devices, depending on the particular type of the compute node 1200. In further examples, the compute node 1200 may be embodied by a respective edge compute node in an edge computing system (e.g., client compute node 1102, edge gateway node 1112, edge aggregation node 1122) or like forms of appliances, computers, subsystems, circuitry, or other components.

Figure 13:
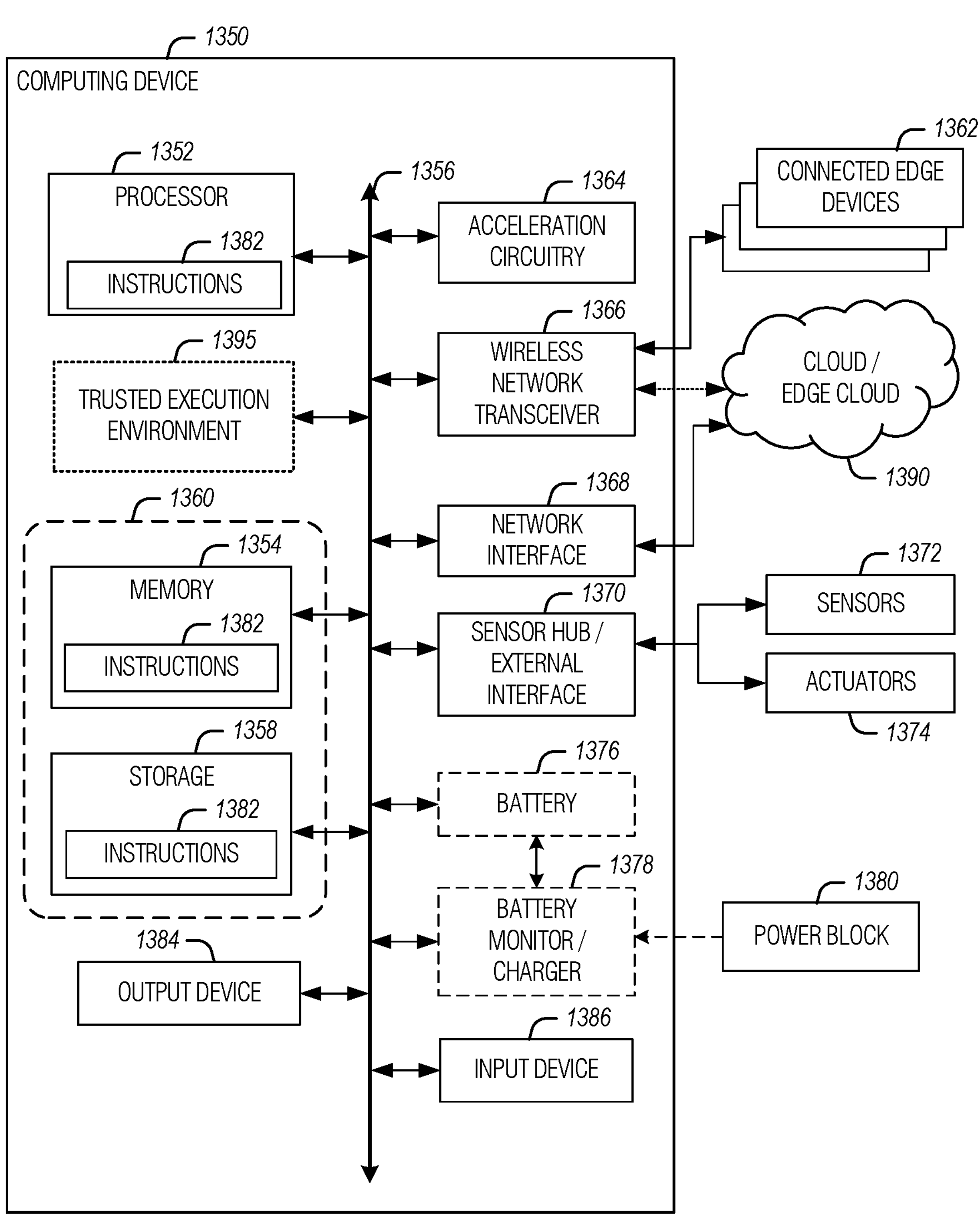
FIG. 13 illustrates a further overview of example components within a computing device, according to an example.

In a more detailed example, FIG. 13 illustrates a block diagram of an example of components that may be present in an edge computing device (or node) 1350 for implementing the techniques (e.g., operations, processes, methods, and methodologies) described herein. The edge computing node 1350 provides a closer view of the respective components of node 1200 when implemented as or as part of a computing device (e.g., as a mobile device, a base station, server, gateway, etc.). The edge computing node 1350 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 1350, or as components otherwise incorporated within a chassis of a larger system.

The edge computing node 1350 may include processing circuitry in the form of a processor 1352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1352 may be a part of a system on a chip (SoC) in which the processor 1352 and other components are formed into a single integrated circuit, or a single package, such as the Edison™ or Galileo™ SoC boards from Intel Corporation, Santa Clara, California. As an example, the processor 1352 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc. The processor 1352 and accompanying circuitry may be provided in a single socket form factor, multiple socket form factor, or a variety of other formats, including in limited hardware configurations or configurations that include fewer than all elements shown in FIG. 13.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs.

To provide for persistent storage of information such as data, applications, operating systems, and so forth, a storage 1358 may also couple to the processor 1352 via the interconnect 1356. In an example, the storage 1358 may be implemented via a solid-state disk drive (SSDD). Other devices that may be used for the storage 1358 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 1358 may be on-die memory or registers associated with the processor 1352. However, in some examples, the storage 1358 may be implemented using a micro hard disk drive (HDD) or solid-state drive (SSD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in an SoC based system. Other bus systems may be included, such as an I2C interface, an SPI interface, point to point interfaces, and a power bus, among others.

The interconnect 1356 may couple the processor 1352 to a transceiver 1366, for communications with the connected edge devices 1362. The transceiver 1366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the edge computing node 1350 may communicate with close devices, e.g., within about 10 meters, using a local transceiver based on BLE, or another low power radio, to save power. More distant connected edge devices 1362, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in the edge cloud 1390 via local or wide area network protocols. The wireless network transceiver 1366 may be an LPWA transceiver that follows the IEEE 802.15.4, or IEEE 802.15.4g standards, among others. The edge computing node 1350 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1368 may be included to provide a wired communication to nodes of the edge cloud 1390 or other devices, such as the connected edge devices 1362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The edge computing node 1350 may include or be coupled to acceleration circuitry 1364, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1356 may couple the processor 1352 to a sensor hub or external interface 1370 that is used to connect additional devices or subsystems. The devices may include sensors 1372, such as accelerometers, level sensors, flow sensors, optical light sensors, camera sensors, temperature sensors, a global navigation system (e.g., GPS) sensors, pressure sensors, barometric pressure sensors, and the like. The hub or interface 1370 further may be used to connect the edge computing node 1350 to actuators 1374, such as power switches, valve actuators, an audible sound generator, a visual warning device, and the like.

In some optional examples, various input/output (I/O) devices may be present within or connected to, the edge computing node 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the edge computing node 1350, although, in examples in which the edge computing node 1350 is mounted in a fixed location, it may have a power supply coupled to an electrical grid, or the battery may be used as a backup or for temporary capabilities. The battery 1376 may be a lithium-ion battery, or a metal-air battery, such as a zinc-air battery, an aluminum-air battery, a lithium-air battery, and the like.

A battery monitor/charger 1378 may be included in the edge computing node 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1378 may communicate the information on the battery 1376 to the processor 1352 over the interconnect 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the edge computing node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the edge computing node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application-specific integrated circuit (ASIC).

Also in a specific example, the instructions 1382 on the processor 1352 (separately, or in combination with the instructions 1382 of the machine readable medium 1360) may configure execution or operation of a trusted execution environment (TEE) 1395. In an example, the TEE 1395 operates as a protected area accessible to the processor 1352 for secure execution of instructions and secure access to data. Various implementations of the TEE 1395, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the edge computing node 1350 through the TEE 1395 and the processor 1352.

In an example, the instructions 1382 provided via memory 1354, the storage 1358, or the processor 1352 may be embodied as a non-transitory, machine-readable medium 1360 including code to direct the processor 1352 to perform electronic operations in the edge computing node 1350. The processor 1352 may access the non-transitory, machine-readable medium 1360 over the interconnect 1356. For instance, the non-transitory, machine-readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram(s) of operations and functionality depicted above. As used herein, the terms "machine-readable medium,"

"computer-readable medium," "machine-readable storage," and "computer-readable storage" are interchangeable.

In an example embodiment, the edge computing node 1350 can be implemented using components/modules/blocks 1352-1386 which are configured as IP Blocks. An IP Block may contain a hardware RoT (e.g., device identifier composition engine, or DICE), where a DICE key may be used to identify and attest the IP Block firmware to a peer IP Block or remotely to one or more of components/modules/blocks 1362-1380. Thus, it will be understood that the node 1350 itself may be implemented as a SoC or standalone hardware package.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The block diagrams of FIGS. 12 and 13 are intended to depict a high-level view of components of a device, subsystem, or arrangement of an edge computing node. However, it will be understood that some of the components shown may be omitted, additional components may be present, and a different arrangement of the components shown may occur in other implementations.

Figure 14:
FIG. 14 illustrates a software distribution platform to distribute software instructions and derivatives, according to an example.
Figure 14:
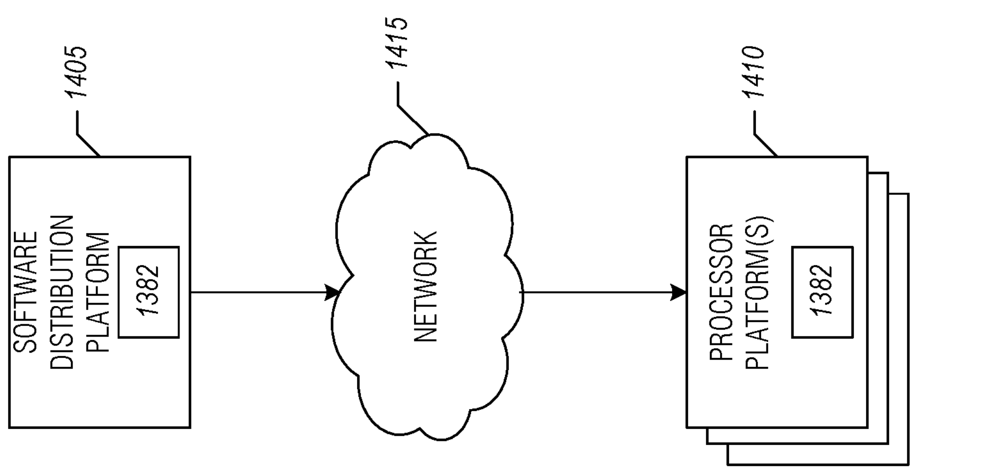

FIG. 14 illustrates an example software distribution platform 1405 to distribute software, such as the example computer readable instructions 1382 of FIG. 13, to one or more devices, such as example processor platform(s) 1410 and/or other example connected edge devices or systems discussed herein. The example software distribution platform 1405 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1405). Example connected edge devices may operate in commercial and/or home automation environments. In some examples, a third party is a developer, a seller, and/or a licensor of software such as the example computer readable instructions 1382 of FIG. 13. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 14, the software distribution platform 1405 includes one or more servers and one or more storage devices that store the computer readable instructions 1382. The one or more servers of the example software distribution platform 1405 are in communication with a network 1415, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1382 from the software distribution platform 1405. For example, the software, which may correspond to example computer readable instructions, may be downloaded to the example processor platform(s), which is/are to execute the computer readable instructions 1382. In some examples, one or more servers of the software distribution platform 1405 are communicatively connected to one or more security domains and/or security devices through which requests and transmissions of the example computer readable instructions 1382 must pass. In some examples, one or more servers of the software distribution platform 1405 periodically offer, transmit, and/or force updates to the software (e.g., the example computer readable instructions 1382 of FIG. 13) to ensure improvements, patches, updates, etc. are distributed and applied to the software at the end user devices.

In the illustrated example of FIG. 14, the computer readable instructions 1382 are stored on storage devices of the software distribution platform 1405 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 1382 stored in the software distribution platform 1405 are in a first format when transmitted to the example processor platform(s) 1410. In some examples, the first format is an executable binary in which particular types of the processor platform(s) 1410 can execute. However, in some examples, the first format is uncompiled code that requires one or more preparation tasks to transform the first format to a second format to enable execution on the example processor platform(s) 1410. For instance, the receiving processor platform(s) 1400 may need to compile the computer readable instructions 1382 in the first format to generate executable code in a second format that is capable of being executed on the processor platform(s) 1310. In still other examples, the first format is interpreted code that, upon reaching the processor platform(s) 1410, is interpreted by an interpreter to facilitate execution of instructions.

Additional examples of the presently described method, system, and device embodiments include the following, non-limiting implementations. The following non-limiting examples may stand on its own or may be combined in any permutation or combination with any one or more of the other examples provided below or throughout the present disclosure.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Additional Notes & Examples

Example 1 is a system, comprising: a processor; and memory to store instructions, which when executed by the processor, cause the system to: receive, at a trusted key access broker, from a requestor, via a broker application programming interface, a request for a cryptographic key operation, the request associated with attestation evidence data; use the attestation evidence data to validate the requestor; in response to validating the requestor, translate and transmit the request for the cryptographic key operation to one of the plurality of key management systems; receive a response from the one of the plurality of key management systems; and transmit the response to the requestor.

In Example 2, the subject matter of Example 1 includes, wherein the request for the cryptographic key operation comprises a request to read, create, modify, or delete a cryptographic key.

In Example 3, the subject matter of Examples 1-2 includes, wherein to use the attestation evidence data to validate the requestor, the instructions cause the trusted key access broker to interface with a trust authority.

In Example 4, the subject matter of Example 3 includes, wherein the trust authority operates using a trust as a service (TaaS) architecture.

In Example 5, the subject matter of Examples 1-4 includes, wherein the plurality of key management systems includes at least one key management system provided by a cloud service provider and at least one key management system provided by a private host.

In Example 6, the subject matter of Examples 1-5 includes, wherein to transmit the request for the cryptographic key operation to one of the plurality of key management systems, the instructions cause the trusted key access broker to: determine a key management system application programming interface to use when accessing the one of the plurality of key management systems; and access the one of the plurality of key management systems to transmit the request for the cryptographic key operation.

In Example 7, the subject matter of Examples 1-6 includes, wherein the response includes a cryptographic key.

In Example 8, the subject matter of Examples 1-7 includes, wherein the response includes an indication of a successful operation on a cryptographic key.

In Example 9, the subject matter of Examples 1-8 includes, wherein the trusted key access broker is executed in a trusted execution environment of the system.

In Example 10, the subject matter of Examples 1-9 includes, instructions, which cause the trusted key access broker to store a transaction log of the request for the cryptographic key operation in an immutable ledger.

In Example 11, the subject matter of Examples 1-10 includes, wherein the broker application programming interface is agnostic to a plurality of key management systems.

Example 12 is a method comprising: receiving, at a trusted key access broker, from a requestor, via a broker application programming interface, a request for a cryptographic key operation, the request associated with attestation evidence data; using the attestation evidence data to validate the requestor; in response to validating the requestor, translating and transmitting the request for the cryptographic key operation to one of the plurality of key management systems; receiving a response from the one of the plurality of key management systems; and transmitting the response to the requestor.

In Example 13, the subject matter of Example 12 includes, wherein the request for the cryptographic key operation comprises a request to read, create, modify, or delete a cryptographic key.

In Example 14, the subject matter of Examples 12-13 includes, wherein using the attestation evidence data to validate the requestor comprises causing the trusted key access broker to interface with a trust authority.

In Example 15, the subject matter of Example 14 includes, wherein the trust authority operates using a trust as a service (TaaS) architecture.

In Example 16, the subject matter of Examples 12-15 includes, wherein the plurality of key management systems includes at least one key management system provided by a cloud service provider and at least one key management system provided by a private host.

In Example 17, the subject matter of Examples 12-16 includes, wherein transmitting the request for the cryptographic key operation to one of the plurality of key management systems comprises: determining a key management system application programming interface to use when accessing the one of the plurality of key management systems; and accessing the one of the plurality of key management systems to transmit the request for the cryptographic key operation.

In Example 18, the subject matter of Examples 12-17 includes, wherein the response includes a cryptographic key.

In Example 19, the subject matter of Examples 12-18 includes, wherein the response includes an indication of a successful operation on a cryptographic key.

In Example 20, the subject matter of Examples 12-19 includes, wherein the trusted key access broker is executed in a trusted execution environment of the system.

In Example 21, the subject matter of Examples 12-20 includes, storing a transaction log of the request for the cryptographic key operation in an immutable ledger.

In Example 22, the subject matter of Examples 12-21 includes, wherein the broker application programming interface is agnostic to a plurality of key management systems.

Example 23 is at least one machine-readable medium including instructions, which when executed by a machine, cause the machine to: receive, at a trusted key access broker, from a requestor, via a broker application programming interface, a request for a cryptographic key operation, the request associated with attestation evidence data; use the attestation evidence data to validate the requestor; in response to validating the requestor, translate and transmit the request for the cryptographic key operation to one of the plurality of key management systems; receive a response from the one of the plurality of key management systems; and transmit the response to the requestor.

In Example 24, the subject matter of Example 23 includes, wherein the request for the cryptographic key operation comprises a request to read, create, modify, or delete a cryptographic key.

In Example 25, the subject matter of Examples 23-24 includes, wherein to use the attestation evidence data to validate the requestor, the instructions cause the trusted key access broker to interface with a trust authority.

In Example 26, the subject matter of Example 25 includes, wherein the trust authority operates using a trust as a service (TaaS) architecture.

In Example 27, the subject matter of Examples 23-26 includes, wherein the plurality of key management systems includes at least one key management system provided by a cloud service provider and at least one key management system provided by a private host.

In Example 28, the subject matter of Examples 23-27 includes, wherein to transmit the request for the cryptographic key operation to one of the plurality of key management systems, the instructions cause the trusted key access broker to: determine a key management system application programming interface to use when accessing the one of the plurality of key management systems; and access the one of the plurality of key management systems to transmit the request for the cryptographic key operation.

In Example 29, the subject matter of Examples 23-28 includes, wherein the response includes a cryptographic key.

In Example 30, the subject matter of Examples 23-29 includes, wherein the response includes an indication of a successful operation on a cryptographic key.

In Example 31, the subject matter of Examples 23-30 includes, wherein the trusted key access broker is executed in a trusted execution environment of the system.

In Example 32, the subject matter of Examples 23-31 includes, instructions, which cause the trusted key access broker to store a transaction log of the request for the cryptographic key operation in an immutable ledger.

In Example 33, the subject matter of Examples 23-32 includes, wherein the broker application programming interface is agnostic to a plurality of key management systems.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system, comprising:

a processor; and memory to store instructions, which when executed by the processor, cause the system to:

receive, at a trusted key access broker, from a requestor, via a broker application programming interface, a request for a cryptographic key operation, the request associated with attestation evidence data;

use the attestation evidence data to validate the requestor;

in response to the validation of the requestor, translate and transmit the request for the cryptographic key operation to one of a plurality of key management systems by:

selecting, based on the request, one key management system from the plurality of key management systems;

determining a key management system-specific application programming interface associated with the selected key management system; and converting the request from a format of the broker application programming interface to a format of the key management system-specific application programming interface using a plugin module associated with the selected key management system;

receive a response from the one of the plurality of key management systems; and transmit the response to the requestor.

2. The system of claim 1, wherein the request for the cryptographic key operation comprises a request to read, create, modify, or delete a cryptographic key.

3. The system of claim 1, wherein to use the attestation evidence data to validate the requestor, the instructions cause the trusted key access broker to interface with a trust authority.

4. The system of claim 3, wherein the trust authority operates using a trust as a service (TaaS) architecture.

5. The system of claim 1, wherein the plurality of key management systems includes at least one key management system provided by a cloud service provider and at least one key management system provided by a private host.

6. The system of claim 1, wherein to transmit the request for the cryptographic key operation to the one of the plurality of key management systems, the instructions cause the trusted key access broker to:

determine a key management system application programming interface to use when accessing the one of the plurality of key management systems; and access the one of the plurality of key management systems to transmit the request for the cryptographic key operation.

7. The system of claim 1, wherein the response includes a cryptographic key.

8. The system of claim 1, wherein the response includes an indication of a successful operation on a cryptographic key.

9. The system of claim 1, wherein the trusted key access broker is executed in a trusted execution environment of the system.

10. The system of claim 1, comprising instructions, which cause the trusted key access broker to store a transaction log of the request for the cryptographic key operation in an immutable ledger.

11. The system of claim 1, wherein the broker application programming interface is agnostic to the plurality of key management systems.

12. A method comprising:

receiving, at a trusted key access broker, from a requestor, via a broker application programming interface, a request for a cryptographic key operation, the request associated with attestation evidence data;

using the attestation evidence data to validate the requestor;

in response to the validation of the requestor, translating and transmitting the request for the cryptographic key operation to one of a plurality of key management systems by:

selecting, based on the request, one key management system from the plurality of key management systems;

determining a key management system-specific application programming interface associated with the selected key management system; and converting the request from a format of the broker application programming interface to a format of the key management system-specific application programming interface using a plugin module associated with the selected key management system;

receiving a response from the one of the plurality of key management systems; and transmitting the response to the requestor.

13. The method of claim 12, wherein using the attestation evidence data to validate the requestor comprises causing the trusted key access broker to interface with a trust authority.

14. The method of claim 13, wherein the trust authority operates using a trust as a service (TaaS) architecture.

15. The method of claim 12, wherein the plurality of key management systems includes at least one key management system provided by a cloud service provider and at least one key management system provided by a private host.

16. The method of claim 12, wherein transmitting the request for the cryptographic key operation to the one of the plurality of key management systems comprises:

determining a key management system application programming interface to use when accessing the one of the plurality of key management systems; and accessing the one of the plurality of key management systems to transmit the request for the cryptographic key operation.

17. The method of claim 12, wherein the response includes a cryptographic key.

18. The method of claim 12, wherein the response includes an indication of a successful operation on a cryptographic key.

19. The method of claim 12, wherein the trusted key access broker is executed in a trusted execution environment.

20. The method of claim 12, comprising storing a transaction log of the request for the cryptographic key operation in an immutable ledger.

* * * * *